Jan. 31, 1961 F. E. DEMOREST 2,969,855
MOTOR VEHICLE BRAKE
Filed Oct. 18, 1956 2 Sheets-Sheet 1

INVENTOR.
F. E. DEMOREST.
BY E.C. McRae
J. R. Faulkner.
T. H. Oster.
R. T. Seeger ATTYS.

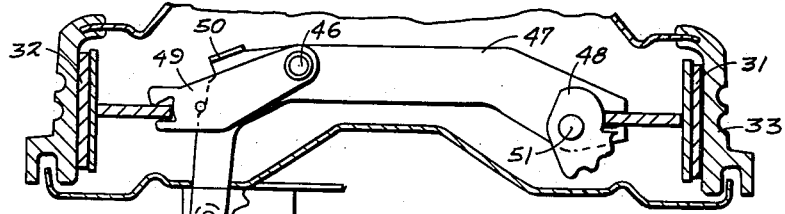
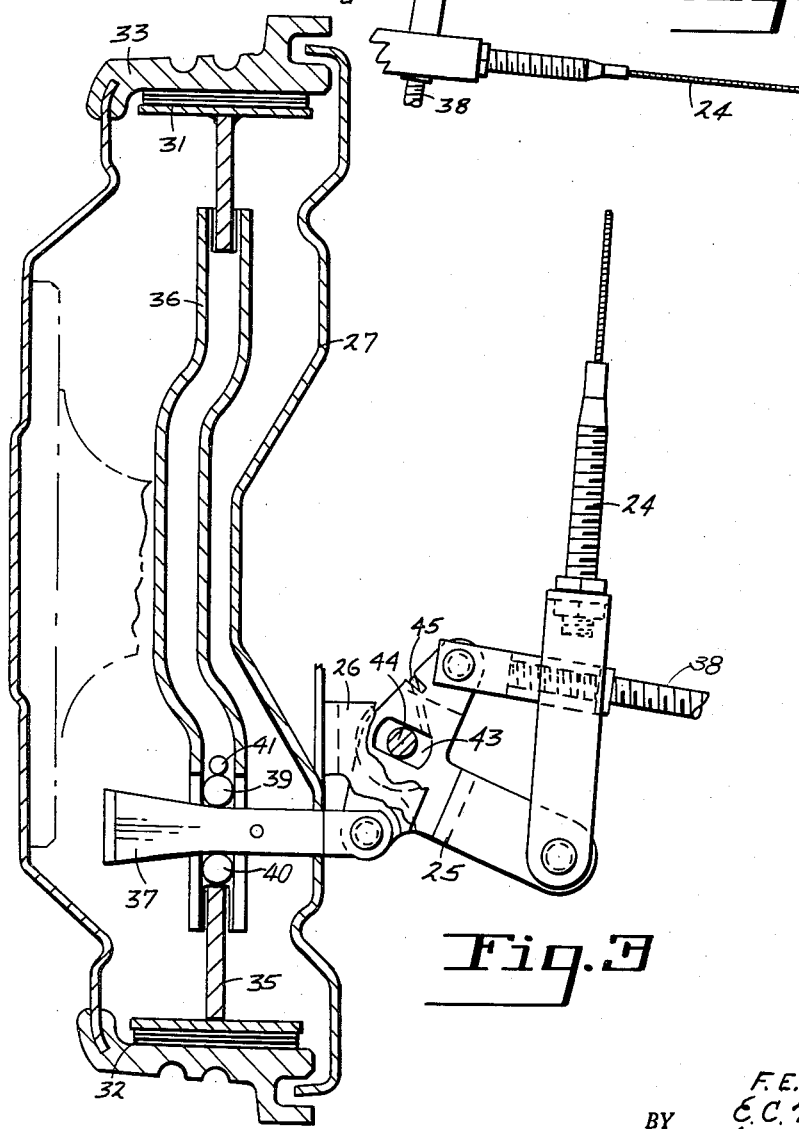

United States Patent Office 2,969,855
Patented Jan. 31, 1961

2,969,855
MOTOR VEHICLE BRAKE

Frank E. Demorest, Dearborn, Mich., assignor to Ford Motor Company, Dearborn, Mich., a corporation of Delaware Filed Oct. 18, 1956, Ser. No. 616,752
1 Claim. (Cl. 188—106)

This invention pertains to a motor vehicle brake assembly and more particularly to a device which is particularly adaptable to a parking brake.

In the past, the linkage used to actuate the parking brake was, in order to equalize the pressure on the brake shoes of the two rear wheels, composed of an operator actuated brake line which was connected about midpoint of the vehicle to a second line which would pull with equal force on the brake shoe applicators. It was found necessary to use this design to obtain the necessary equal brake applicator force and hence a large area of the vehicle undercarriage was used. Also, in assembling this brake assembly on the production line, the wheel drum had to be placed on the axle after the parking brake assembly was completed. In addition, with braking shoe applicators of the past in order to get the needed mechanical advantage a construction was used that would apply more force to the front shoe than the rear shoe which would result in poor holding for rearward movement of the car. This is due to the fact that brake "wrap up" for a particular direction is dependent on the force applied to the shoe corresponding to that direction.

Therefore, it is an object of this invention to provide equal braking force to the rear wheels of a motor vehicle while using but one braking line from the operator's compartment to one of the rear wheels.

It is an object of this invention to provide a parking brake assembly which will allow the wheel drum to be preassembled to the axle.

It is a further object to provide a parking brake which through equal application of force to the front and rear shoes will hold the vehicle better from reverse movement.

These and other objects will become more apparent when an embodiment of this invention is described in detail and in connection with drawings in which:

Figure 3 is a section taken at 3—3 of Figure 2 showing the equalizer with the floating pivot and also the brake shoe applicator which provides equal force to both shoes; and Figure 4 shows a second embodiment of the brake shoe applicator having a toggle joint for force multiplication.

Figure 1:
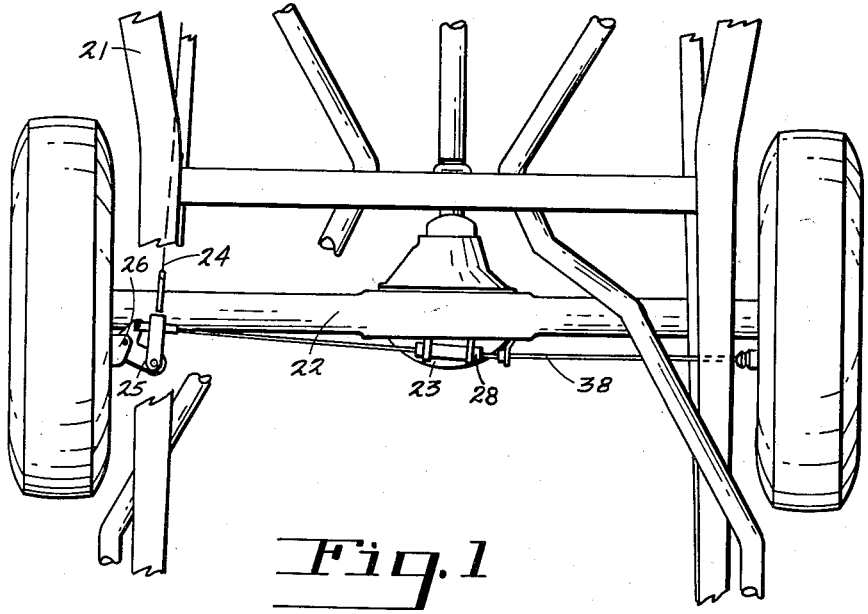
Figure 1 shows a plan view of a partial frame and wheel assembly.
Figure 2:
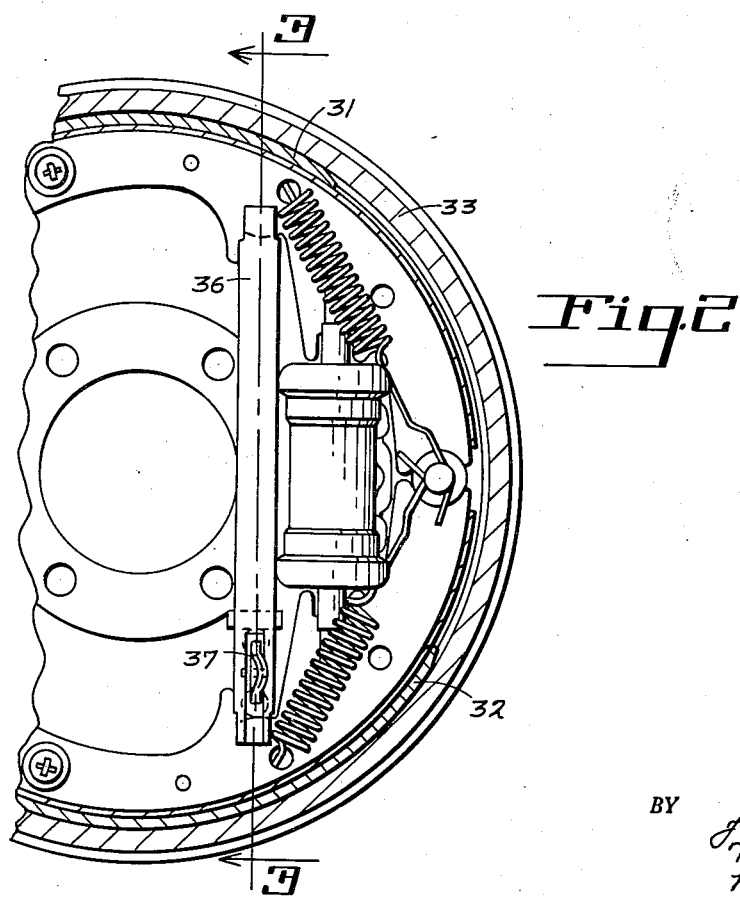
Figure 2 is a partial elevation view of a brake and wheel assembly.

In Figure 1 is seen vehicle frame 21, rear axle 22 with differential 23. Operator actuated brake line 24 is shown pivoted to equalizer 25 which is pivoted to mount 26 which is fixed to brake shoe plate 27, seen more clearly in Figure 3. The forward end of brake line 24 leads to the operator compartment where it is operator actuated. Cable 38 is pivoted to equalizer 25 and leads to right brake assembly. Nylon tube 28 provides a self lubricating passage for cable 38. In this respect, line 24 may have a nylon housing near the operator's compartment to reduce friction at the point of severest bending. In Figure 2 are seen front brake shoe 31 and rear brake shoe 32 along with drum 33. Shoe applicator 36 is a two piece expansible member which is expanded when wedge 37 is moved laterally. Figure 3 shows more clearly the relation between equalizer 25, brake line 24 and wedge 37. Connecting cable 38 is also attached to equalizer 25 and at its other end is attached to a like wedge shaped member in the opposite rear wheel as may be seen in Figure 1. The sides of wedge 37 contact rollers 39, 40 which abut respectively pin 41, which is fixed to member 36, and link 35 which is attached to the rear brake shoe. Link 35 and member 36 comprise an expansible assembly which upon inward movement of wedge 37 will apply equal force to front and rear brake shoes 31, 32. Slot 43 in equalizer 25 fits about pivot 44 which is fixed to mounting 26. Spring 45 urges equalizer 25 clockwise in a brake releasing position. It can be seen that when equalizer 25 is rotated counterclockwise by brake line 24, slot 43 will slide relative to pivot 44 until equal forces are applied to the wedges in either brake assembly.

In Figure 4 the same equalizer assembly is shown but a second brake applicator is used. Link 47 is connected through adjuster 48 to front brake shoe 31 while link 49 which is pivoted to link 47 is connected to rear brake shoe 32. Upon rotation of equalizer 25 pivot 46, which is shown in a brake release position, is moved downwardly expanding the linkage between the shoes 31, 32. Stop 50 prevents pivot 46 from going over center and locking the brakes. By rotating adjuster 48 about its pivot 51 brake shoe wear may be compensated for.

In the operation of the embodiment shown in Figure 3, brake line 24 when activated by the operator rotates equalizer 25 counterclockwise drawing wedges 37 inwardly. Any inequality of force between the two wedges will be sensed by the equalizer and if more force is needed for the right brake shoe or line 38 the equalizer will move leftwardly and if more is needed by the left brake assembly it will move rightwardly. The same is true with the embodiment shown in Figure 4 but in this case instead of a wedge forcing apart an expansible member, a toggle linkage is used to provide the desired mechanical advantage.

It may also be seen that during production the drum assembly may be applied to the axle before these are assembled to the frame and afterwards all that need be done to connect the parking brake assembly is to connect equalizer 25 by means of pivots to the respective lines.

It will be understood that the invention is not to be limited to the exact construction shown and described, but that various changes and modifications may be made without departing from the spirit and scope of the invention, as defined in the appended claim.

What is claimed is:

A motor vehicle brake system comprising a pair of brake assemblies, said assemblies each having a backing plate and arcuate brake shoes mounted on each said plate, separate mechanical means for separating said brake shoes of each assembly, a double crank pivotally mounted on one of said backing plates, one arm of said crank being pivotally connected to one of said separate mechanical means, another arm of said crank being connected by a cable to the means of the other brake assembly, and a manually actuated cable connected to said crank.

References Cited in the file of this patent
UNITED STATES PATENTS

| | | |
|---|---|---|
| 1,899,644 | Sneed | Feb. 28, 1933 |
| 1,910,451 | Taylor | May 23, 1933 |
| 1,962,081 | Krieg | June 5, 1934 |
| 1,966,140 | Sanford | July 10, 1934 |
| 1,994,823 | Kohr | Mar. 19, 1935 |
| 2,022,046 | La Brie | Nov. 26, 1935 |
| 2,048,254 | Gallaher | July 21, 1936 |
| 2,073,081 | Vissat | Mar. 9, 1937 |
| 2,193,360 | Haines | Mar. 12, 1940 |
| 2,226,457 | Whittingham | Dec. 24, 1940 |